United States Patent
Li et al.

(10) Patent No.: US 12,386,127 B2
(45) Date of Patent: Aug. 12, 2025

(54) MICRO-LENS ARRAY OPTICALLY COUPLED WITH A PHOTONICS DIE

(71) Applicant: Intel Corporation, Santa Clara, CA (US)

(72) Inventors: Xiaoqian Li, Chandler, AZ (US); Nitin Deshpande, Chandler, AZ (US); Omkar Karhade, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 854 days.

(21) Appl. No.: 17/131,597

(22) Filed: Dec. 22, 2020

(65) Prior Publication Data

US 2022/0196931 A1 Jun. 23, 2022

(51) Int. Cl.
  *G02B 6/42* (2006.01)
  *G02B 6/30* (2006.01)
  *G02B 6/34* (2006.01)

(52) U.S. Cl.
  CPC .............. *G02B 6/423* (2013.01); *G02B 6/30* (2013.01); *G02B 6/4204* (2013.01); *G02B 6/4206* (2013.01); *G02B 6/4214* (2013.01); *G02B 6/4239* (2013.01); *G02B 6/4244* (2013.01); *G02B 6/34* (2013.01)

(58) Field of Classification Search
  CPC .......... G02B 6/30; G02B 6/34; G02B 6/4204; G02B 6/4206; G02B 6/4214; G02B 6/423; G02B 6/4239; G02B 6/4244
  See application file for complete search history.

(56) References Cited

U.S. PATENT DOCUMENTS

| | | | | |
|---|---|---|---|---|
| 7,118,293 B2 * | 10/2006 | Nagasaka | ............ | G02B 6/4214 |
| | | | | 385/89 |
| 7,539,366 B1 * | 5/2009 | Baks | .................... | H05K 1/0274 |
| | | | | 385/33 |
| 9,341,786 B1 * | 5/2016 | Gamache | ................. | G02B 6/30 |
| 9,377,594 B2 * | 6/2016 | Liff | .......................... | G02B 6/43 |
| 9,900,102 B2 * | 2/2018 | Dosunmu | .............. | H01L 25/50 |
| 2006/0239605 A1 | 10/2006 | Palen et al. | | |
| 2013/0301982 A1 | 11/2013 | Lee | | |
| 2015/0037044 A1 | 2/2015 | Peterson et al. | | |
| 2015/0139590 A1 * | 5/2015 | Oniki | ................... | G02B 6/3853 |
| | | | | 385/79 |
| 2017/0131469 A1 * | 5/2017 | Kobrinsky | ........... | G02B 6/4257 |

OTHER PUBLICATIONS

Extended European Search Report from European Patent Application No. 21195459.9, mailed Mar. 1, 2022, 8 pgs.
Office Action from European Patent Application No. 21195459.9, mailed Nov. 22, 2024, 7 pgs.

* cited by examiner

*Primary Examiner* — Daniel Petkovsek
(74) *Attorney, Agent, or Firm* — Schwabe, Williamson & Wyatt, P.C.

(57) ABSTRACT

Embodiments described herein may be related to apparatuses, processes, and techniques for coupling a micro-lens array to a photonics die. In embodiments, this coupling may be performed as an attach at a wafer level. In embodiments, wafer level optical testing of the photonics die with the attached micro-lens array may be tested electrically and optically before the photonics die is assembled into a package, in various configurations. Other embodiments may be described and/or claimed.

21 Claims, 12 Drawing Sheets

MICRO-LENS ARRAY OPTICALLY COUPLED WITH A PHOTONICS DIE

FIELD

Embodiments of the present disclosure generally relate to the field of semiconductor packaging, and in particular to micro-lens arrays physically and optically coupled with a photonics die.

BACKGROUND

Continued growth in virtual machines and cloud computing will continue to increase the demand for high-quality optical receiver and transmitter devices.

DETAILED DESCRIPTION

Figure 1:
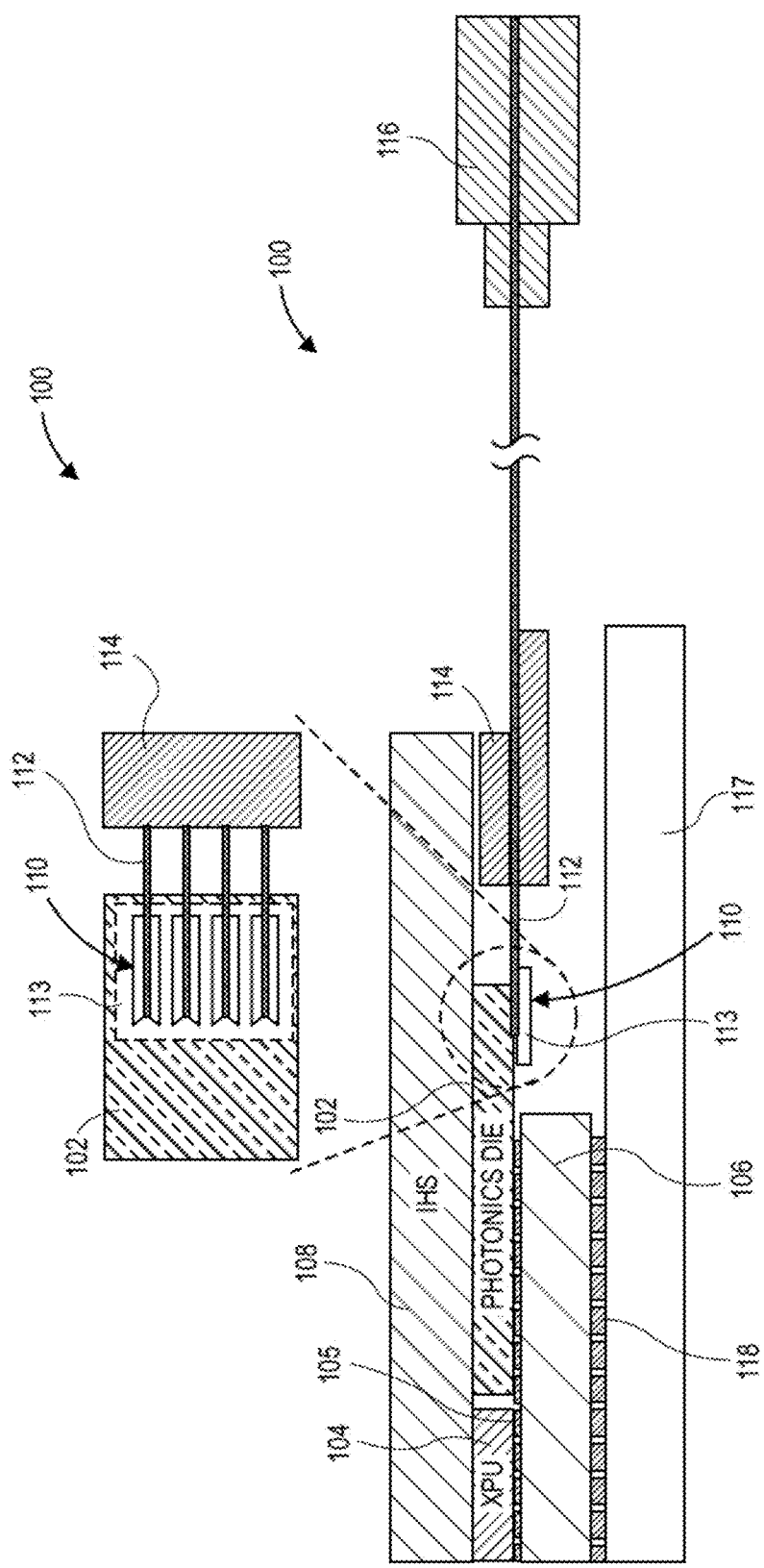
FIG. 1 illustrates a side view and a bottom view of an example legacy photonics package with optical fibers optically coupled to a photonics die using one or more V-grooves.

Embodiments described herein may be related to apparatuses, processes, and techniques related to coupling a micro-lens array to a photonics die. In embodiments, this coupling may be performed as an attach at a wafer level. In embodiments, wafer level optical testing of the photonics die with an attached micro-lens array may be tested electrically and optically before the photonics die is assembled into a package, resulting in a higher package yield.

For photonics packaging, including silicon photonics packaging, one challenge is to have highly accurate alignments between silicon optical waveguides and external optical waveguides. For example, between optical fibers that are coupled with optical waveguides of an optical transceiver. Typically, accurate alignments require a nanometer (nm) level alignment accuracy. In addition, the interface should be robust to endure operational stresses without degradation in reliability and/or optical performance degradation.

In embodiments, the micro-lens array may use collimated optical beams. This may reduce, afterward-alignment accuracy requirements, which in turn may facilitate low-cost/high-volume manufacturing (HVM)-scalable packaging processes that include these photonics dies. For example, without using a lens array, the alignment accuracy needed for a quality optical coupling may be ~1-2 um. With a lens array, this alignment accuracy may be relaxed to ~10 um or so. This is because a lens can collimate the beam of light to a larger diameter. Thus, a lower alignment requirement can be achieved using less expensive tooling and faster manufacturing processes. In addition, process control requirements may be less stringent. Thus, in embodiments higher yields can be obtained using lenses.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the Figures, and sizes, thicknesses, or dimensions may be assumed for some embodiments only where specifically indicated or discussed.

FIG. 1 illustrates a side view and a bottom view of an example legacy photonics package with optical fibers optically coupled to a photonics die using one or more V-grooves. Legacy package 100 shows a partial side view of a legacy photonics package that includes a photonics die 102 that is electrically coupled with an XPU 104. In embodiments, the photonics die 102 and the XPU 104 may be electrically coupled using an electrical interface 105. The electrical interface 105 may include an interconnect bridge, such as an embedded multi-die interconnect bridge (EMIB), or a silicon interposer, organic routing on substrate 106 or a redistribution layer (RDL) on substrate 106, or some other electrical coupling. In embodiments, the electrical coupling may be a high density electrical coupling.

In implementations, the XPU 104 and the photonics die 102 may be thermally coupled to an integrated heat spreader (IHS) 108. In implementations, there may be a thermal interface material (TIM) (not shown), such as a thermal paste, that is disposed between the IHS 108 and the XPU 104 and photonics die 102 to route heat away from the XPU 104 and photonics die 102.

In implementations, the photonics die 102 may overhang the substrate 106 where V-grooves 110 may be used to align a first set of optical fibers 112 so that they are optically coupled with the photonics die 102. In other implementations, these V-grooves 110 may take various other shapes and dimensions as required to facilitate a high quality optical coupling with the photonics die 102. In implementations, an epoxy 113 may be applied to secure the first set of optical fibers 112 to the photonics die 102.

A support structure 114 may be physically coupled with the IHS 108 to support the first set of optical fibers 112 to facilitate the quality and robustness of the optical connection of the first set of optical fibers 112 with the photonics die 102. In other embodiments, the support structure 114 may be physically coupled with some other component of the legacy package 100. In implementations, the fibers 112 may optically couple with an optical coupler 116, which may be implemented as a ferrule or other similarly functioning device, to optically couple with light sources outside legacy package 100. In embodiments, the optical coupler 116 may be seen as a "pigtail" to which one or more optical fibers (not shown) may be inserted during assembly of the legacy package 100 into a computing system to create an optical circuit that includes the first set of optical fibers 112 and the photonics die 102.

In implementations, the substrate 106 may be coupled with a printed circuit board (PCB) 117 using solder ball connections 118 in a ball attach process. In other implementations, the substrate 106 may be coupled with the PCB 117 using bumps, land pads, pins, or some other electrical and/or physical coupling mechanism.

In implementations of legacy package 100, each fiber of the first set of optical fibers 112 needs to align with the silicon waveguide in the photonics die 102 very accurately. With a long pigtail, where the first set of optical fibers 112 may include 24 individual fibers per photonics die. In other implementations of legacy package 100, there may be multiple photonics dies (not shown), for example, up to six photonics dyes per package, each with a single fiber 112 sitting in a V-groove 110 and bonded by optical epoxy 113. This legacy assembly may lack physical, optical, and/or electrical robustness during handling and operation.

Figure 2:
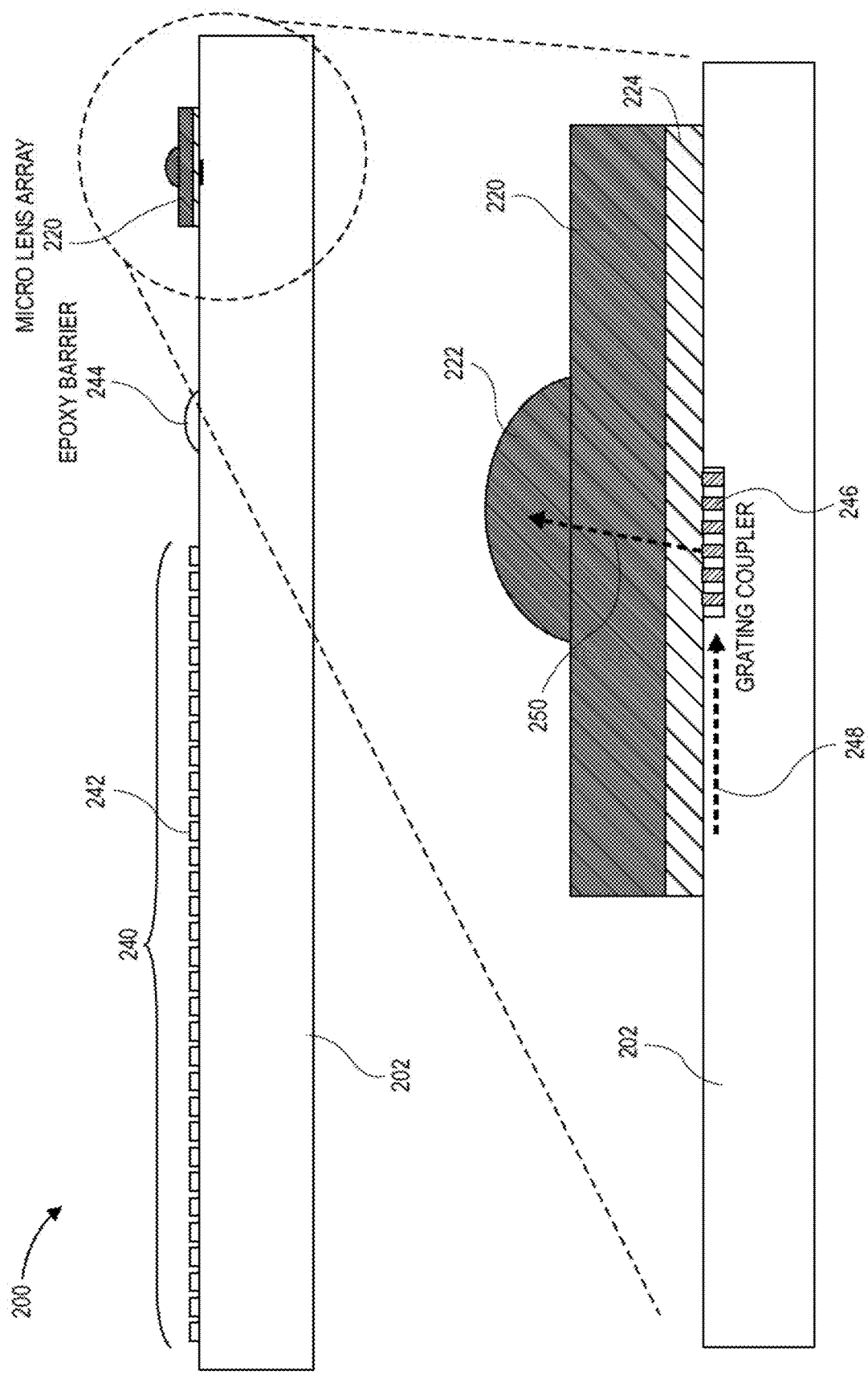
FIG. 2 illustrates a front view of a photonics die that includes a micro-lens array, in accordance with various embodiments.

FIG. 2 illustrates a front view of a photonics die that includes a micro-lens array, in accordance with various embodiments. Diagram 200 shows a photonics die 202, which may be similar to photonics die 102 of FIG. 1, that includes a micro-lens array 220 that is optically coupled with the photonics die 202. In embodiments, a micro-lens array 220 may have one lens per fiber. So, if a fiber pitch is 125-250 um pitch, the micro-lens array 220 will have the same pitch. Thus, the micro-lens array 220 may be a very small array, and may be typically manufactured in array form. Since the micro-lens array 220 is at micro scale, it is referred to as a micro-lens array 220.

In embodiments, the micro-lens array 220 may be optically coupled using an epoxy 224, which may be similar to epoxy 113 of FIG. 1. In embodiments, the epoxy 224 may be an optical adhesive used to bond or cement optical components together. Optical adhesives may allow for precise positioning of optical components prior to physically attaching to the photonics die 202, and do not obscure a light path once the adhesive is cured.

In embodiments, the photonics die 202 may include a bump region 240, which includes multiple bumps 242 that may be used to electrically couple with an electrical interface such as electrical interface 105 of FIG. 1. In embodiments, the bump region 240 may be referred to as a first level interconnect (FLI) bump region. In embodiments, the electrical interface to which the bump region 240 may be electrically coupled may be an EMIB to facilitate high-speed electrical communication between the photonics die 202 and another package die, for example XPU 104 of FIG. 1. In embodiments, there may be an epoxy barrier 244 that may be physically applied to the photonics die 202 and positioned between the micro-lens array 220 and the bump region 240. The epoxy barrier 244 has a height that will prevent epoxy 224 from entering the bump region 240 during the manufacturing process. The epoxy barrier 244 will prevent the epoxy 224 from interfering with the electrical operation and/or subsequent attach of the bump region 240 to another component, such as the electrical interface 105 or the substrate 106 of FIG. 1, during the manufacturing process when the micro-lens array 220 is coupled with the photonics die 202.

Turning now to the detail of the micro-lens array and where it attaches to the photonics die, the micro-lens array 220 may be positioned proximate to a grating coupler 246. In embodiments, the grating coupler 246 may be used for vertically optically coupling light, and may include periodic etch structures designed to diffract light in a different direction. In embodiments, a light path 248 may transmit light within the photonics die 202, and may be optically coupled with the grating coupler 246. The grating coupler 246 may then change the direction of the optical path 250 toward a lens 222 of the micro-lens array 220. By varying the position of the grating coupler 246 within the photonics die 202 in relation to the lens 222, or by varying the design of the grating coupler 246, the direction light path 250 may be designed for a particular angle. In embodiments, there may be a grating coupler 246 associated with each of the lenses 222 of the micro-lens array 220

Figure 3:
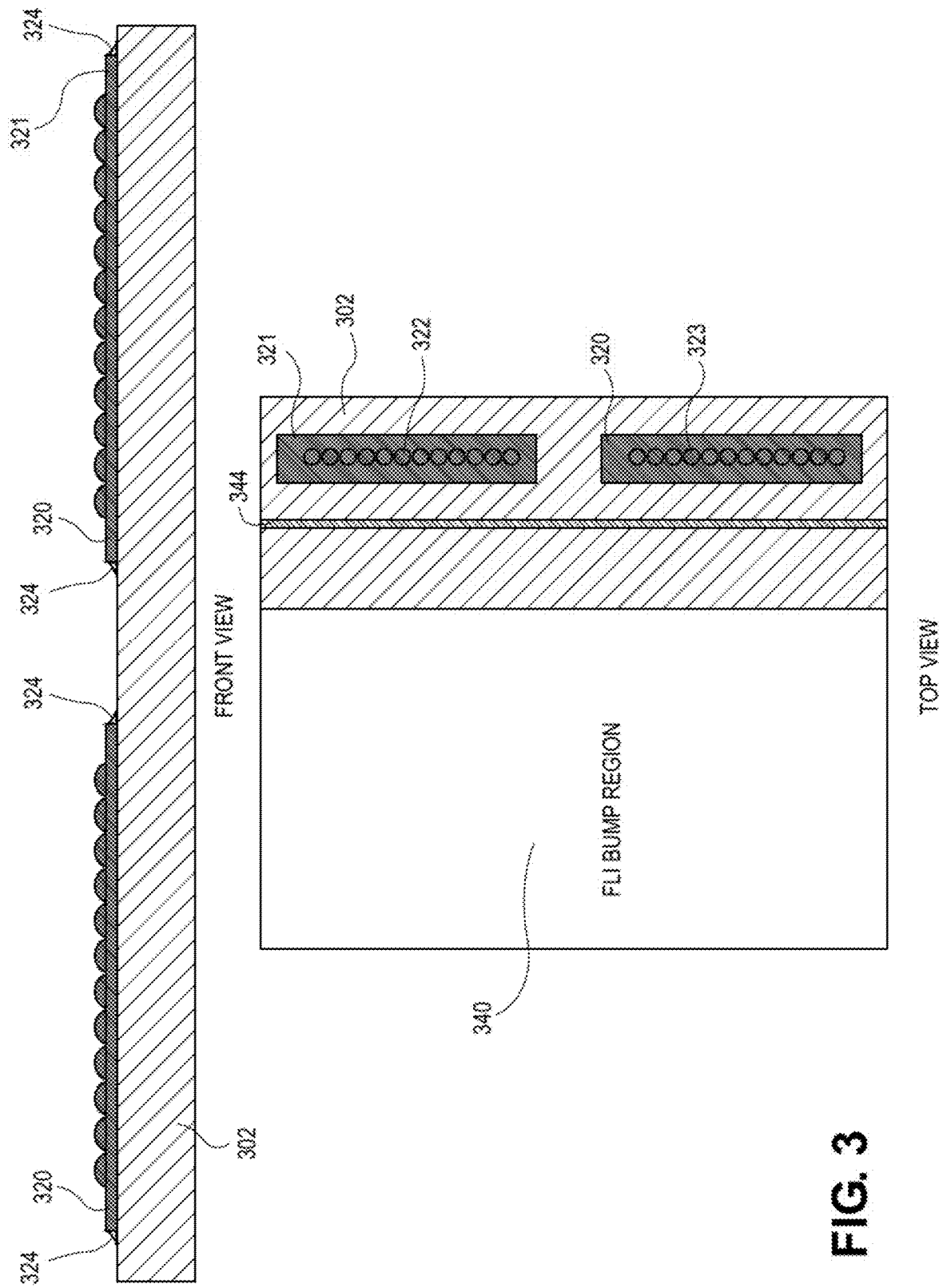
FIG. 3 illustrates a front and a top view of a photonics die that includes multiple micro-lens arrays, in accordance with various embodiments.

FIG. 3 illustrates a front and a top view of a photonics die that includes multiple micro-lens arrays, in accordance with various embodiments. Micro-lens arrays 320, 321, which may be similar to micro-lens array 220 of FIG. 2, are arranged on a photonic die 302, which may be similar to photonic die 202 of FIG. 2. As shown, the micro-lens arrays 320, 321 are oriented in a line, and are physically and optically coupled with the photonic die 302 using an epoxy 324, which may be similar to epoxy 224 of FIG. 2. In embodiments, epoxy barrier 344, which may be similar to epoxy barrier 244 of FIG. 2, is physically coupled with the photonics die 302. The epoxy barrier 344 may serve to protect, for example a first level interconnect bump region 340, that may be used to electrically couple the photonics die to an interconnect bridge or to another die.

As shown, each of the lenses 322 and lenses 323, which may be similar to lens 222 of FIG. 2, are oriented in a line and may be grouped within a particular micro-lens array 320, 321. FIG. 3 shows just one example of a micro-lens array layout. In other embodiments, the micro-lens arrays 320, 321 may be parallel with each other (not shown). A different number of individual lenses 322, 323 may be used with various micro-lens arrays 320, 321.

Figure 4:
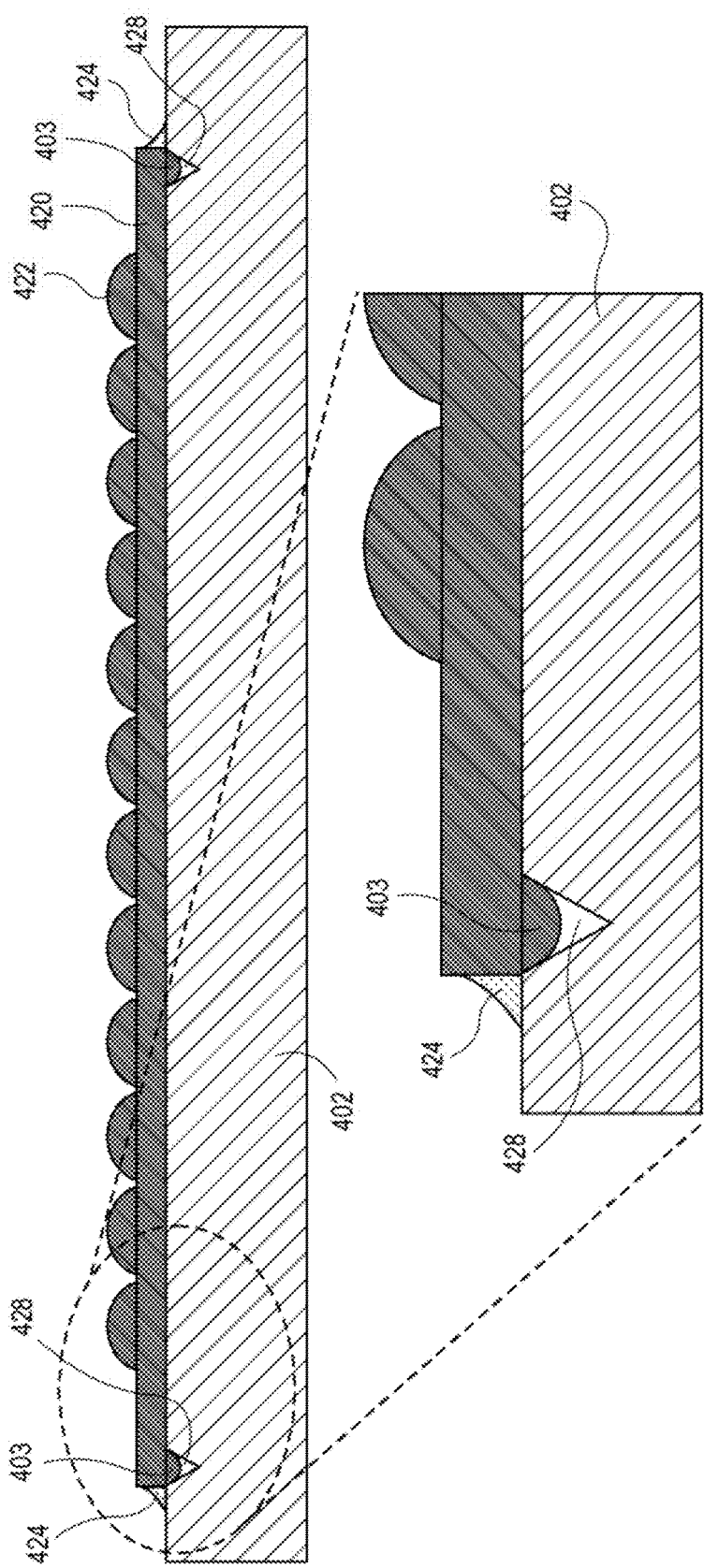
FIG. 4 illustrates an example of physical alignment features to align a micro-lens array onto a photonics die, in accordance with various embodiments.

FIG. 4 illustrates an example of physical alignment features to align a micro-lens array onto a photonics die, in accordance with various embodiments. As discussed above and elsewhere herein, accurate alignment between waveguides within a photonics die and external waveguides, at a nanometer level, is very important for optical performance and optical signal quality. In embodiments, micro-lens array 420, which may be similar to micro-lens array 320 of FIG. 3 may be positioned onto a photonics die 402, which may be similar to photonics die 302 of FIG. 3, with great precision using physical alignment features.

In one embodiment, as shown, a V-groove 428 may be created in a surface of the photonics die 402 at a required depth to mate with a bump 403 that is placed on a side of the micro-lens array 420 opposite the side that includes the lenses 422. In embodiments, the V-groove 428 and the bump 403 may be dimensioned so that there is almost no positioning variation when the micro-lens array 420 is applied to the photonics die 402. The V-groove 428 may be created using the same anisotropic etching technique as the other V-grooves for fibers. V-groove 428 may be long as a groove or it can also be an inverted pyramid. Before etching the V-grooves 428 (or V pyramids), a mask layer (not shown) is deposited on the silicon (typically silicon nitride or oxide). The mask layer openings (not shown) are created using lithography. All V-groove 428 openings can be created in a single lithography step which eliminates any XY alignment errors between V-groove 428 and other V grooves. As the micro-lens array 420 is self-aligned in 428 and fibers, which may be similar to fibers 112 of FIG. 1, are self-aligned in the fiber V-grooves, which may be similar to V-grooves 110 of FIG. 1, the position error between lens array and fibers becomes very small. In other embodiments, a groove (not shown) may be made into a side of the micro-lens array 420, and a bump (not shown) may be created on the surface of the photonics die 402. In embodiments, an epoxy 424, which may be similar to epoxy 324 of FIG. 3, may be applied before the micro-lens array 420 is applied to the photonics die 402.

In embodiments, there may be multiple V-grooves 428 and/or bumps 403 applied in different orientations along a side of the micro-lens array 420 (not shown), in order to provide alignment in both an X and a Y direction along the surface of the photonics die 402. In embodiments, these physical alignment features may be important to align the various lenses 422 with various grating couplers, such as grating coupler 246 of FIG. 2 to facilitate optimal optical path alignment.

The descriptions above with respect to FIGS. 2-4 are generally directed to physically and optically coupling a micro-lens array, such as micro-lens array 420, to a photonics die such as photonics die 402. The discussion below is generally directed to optically coupling optical paths outside the photonics die 402 with the photonics die 402 using the micro-lens array 420.

Figure 5:
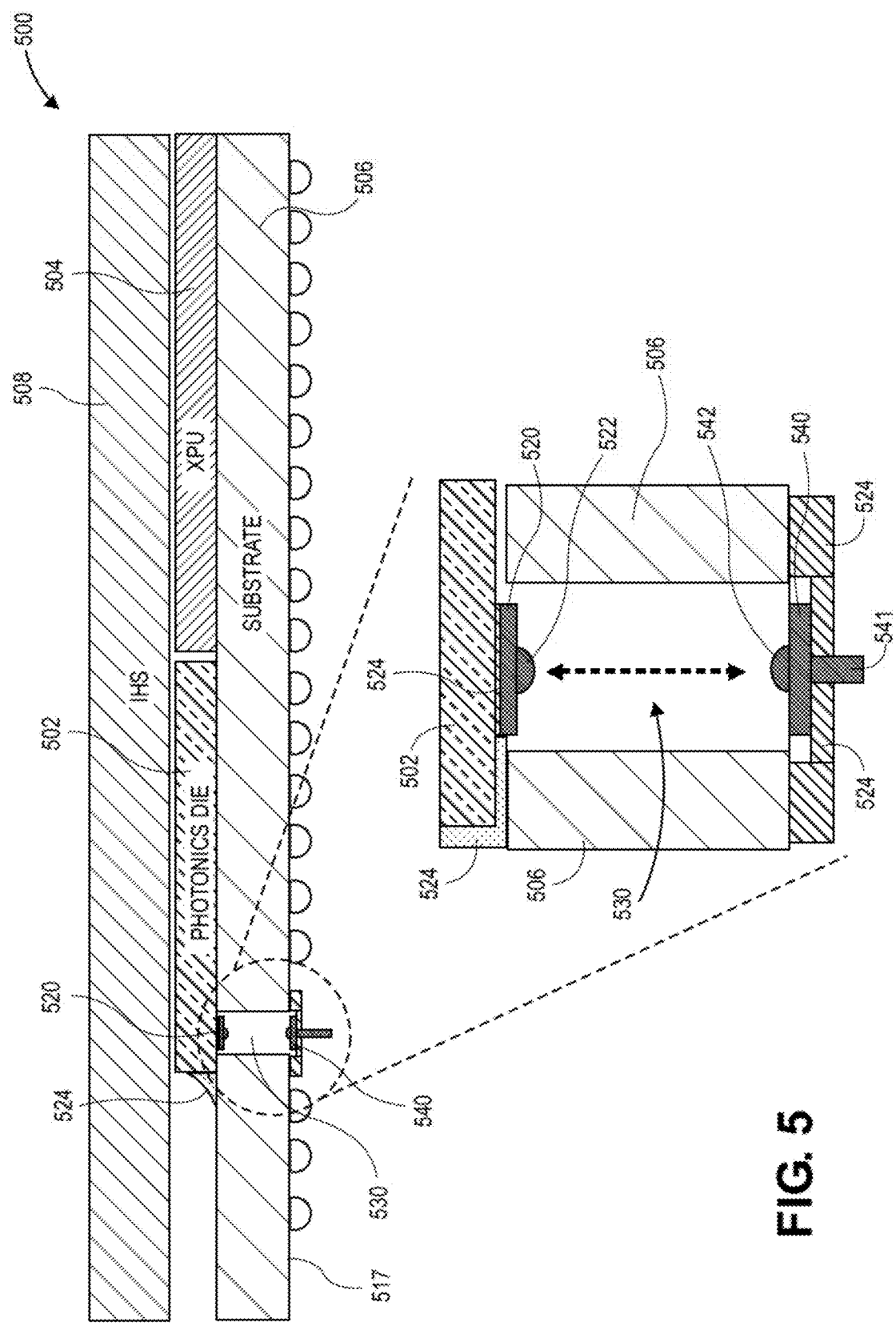
FIG. 5 illustrates an example package that includes a photonics die coupled with a substrate that has an opening to allow a light path to reach a micro-lens array on the photonics die, in accordance with various embodiments.

FIG. 5 illustrates an example package that includes a photonics die coupled with a substrate that has an opening to allow a light path to reach a micro-lens array on the photonics die, in accordance with various embodiments. Photonics package 500 shows a photonics die 502, that may be similar to photonics die 302 of FIG. 3, that is electrically coupled with XPU 504, thermally coupled with IHS 508, and physically and/or electrically coupled with substrate 506, which may be similar to XPU 104, IHS 108, and substrate 106 of FIG. 1. A micro-lens array 520, which may be similar to micro-lens array 320 of FIG. 3, is optically coupled with the photonics die 502. In embodiments the photonics die 502 may be an optical receiver, optical transmitter, and/or optical transceiver.

Substrate 506 includes a cavity 530 into which all or part of the micro-lens array 520 may be inserted. The cavity 530 may serve as a light path between a lens 522 of the micro-lens array 520 of the photonics die 502 and a lens 542 of a second micro-lens array 540 that may be coupled with a side 517 of the substrate 506 opposite the photonics die 502. In embodiments, the cavity 530 may include a waveguide, a light-transmitting material, or one or more optical fibers. In embodiments, the light-transmitting material may include optical adhesive, silicon, or glass. In embodiments, the cavity 530 may be an open air channel. In embodiments, the cavity 530 may be made into the substrate 506 during the time of substrate manufacture.

In embodiments, the second micro-lens array 540 may be coupled with the side 517 of the substrate 506 using an epoxy 524, which may be similar to epoxy 224 of FIG. 2, or can be mechanically plugged in from the BGA side of the substrate 517. A waveguide 541, which may be a light-transmitting material or one or more optical fibers, may optically couple with the second micro-lens array 540. In embodiments, there may be multiple micro-lens arrays 520 coupled with the photonics die 502, which will be aligned with multiple second micro-lens arrays 540 and optically coupled through cavity 530. In embodiments, light may be transmitted and/or received from a ball grid array (BGA) side 517 of the substrate 506.

Figure 6:
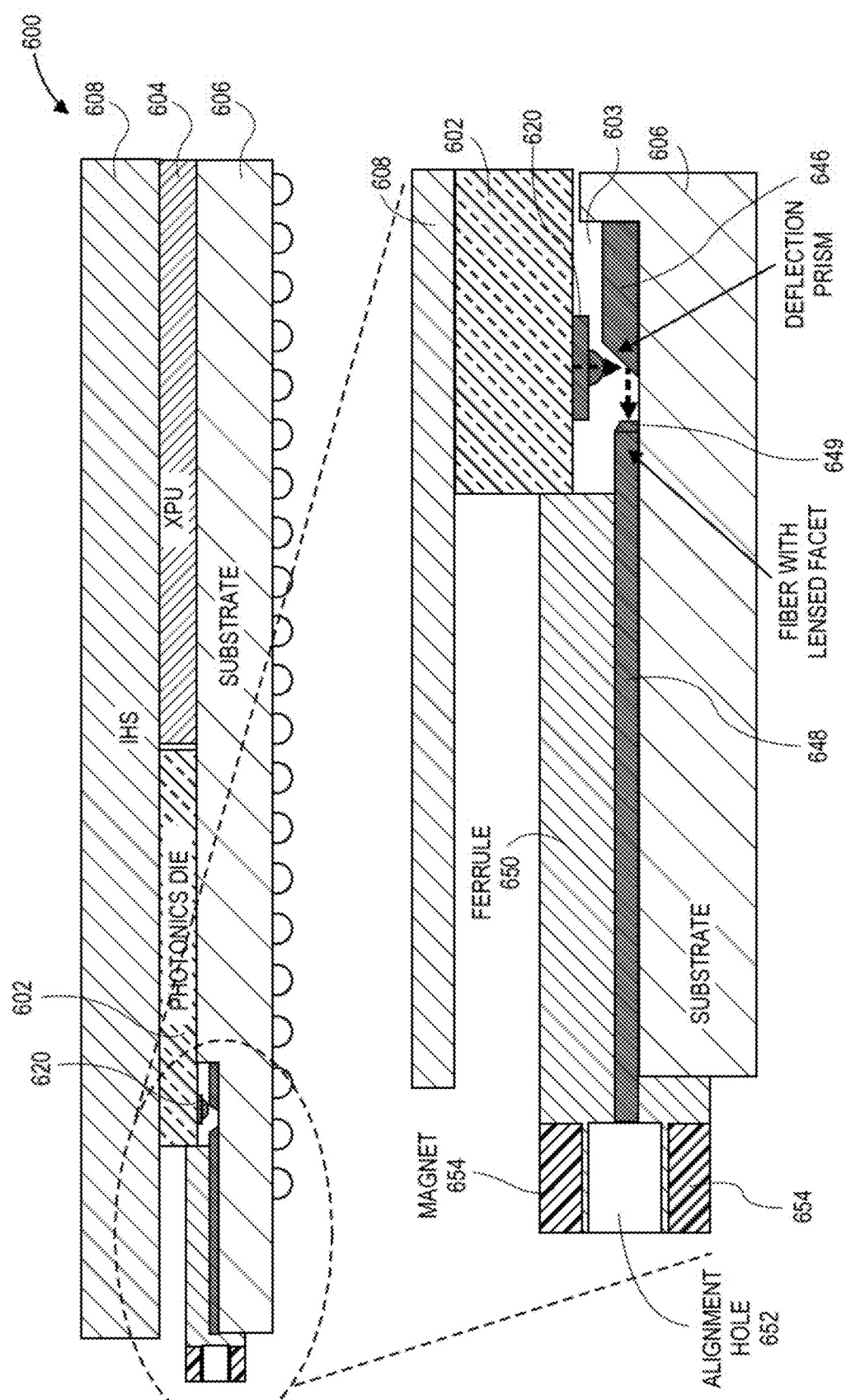
FIG. 6 illustrates an example package that includes a photonics die coupled with a substrate and overhanging the substrate, with a deflection prism coupled with the substrate to change direction of light along a light path to a micro-lens array coupled with the photonics die, in accordance with various embodiments.

FIG. 6 illustrates an example package that includes a photonics die coupled with a substrate and overhanging the substrate, with a deflection prism coupled with the substrate to change direction of light along a light path to a micro-lens array coupled with the photonics die, in accordance with various embodiments. Photonics package 600 shows a photonics die 602 that is electrically coupled with XPU 604, thermally coupled with IHS 608, and physically and/or electrically coupled with substrate 606, which may be similar to photonics die 502, XPU 504, IHS 508, and substrate 506 of FIG. 5. A micro-lens array 620, which may be similar to micro-lens array 520 of FIG. 5, is optically coupled with the photonics die 602. As shown, the portion of the photonics die 602 that includes the micro-lens array 620 may be disposed in an overhang portion 603 above the substrate 606.

As shown with this embodiment, the overhang portion 603 may also include a deflection mechanism 646 to change direction of the light path entering or leaving the micro-lens array 620. In embodiments, this mechanism 646 may be a deflection prism, a 45° reflector, which can be created through certain surface coating, or through refractive index difference. The deflection mechanism 646 may provide optical coupling for light entering or leaving the micro-lens array 620. In embodiments this light may travel down fiber array 648. In embodiments, each fiber of the fiber array 648 may include a lensed facet 649 to transmit and receive light to and from the deflection mechanism 646, or this can be a lens array attached to the fiber array end.

In embodiments, fiber array 648 may be physically coupled with the substrate 606. In embodiments, the fiber array may be secured by a connector body 650, which may be physically coupled with the substrate 606. The connector body 650 top plate may secure the fiber array 648 defined in certain pitch.

An alignment hole 652 is included in the ferule design. In this way, a mating ferrule of another fiber connector with an array of optical fibers (not shown) may be inserted into the alignment hole 652 and provide a high-quality optical coupling with the fiber array 648. In embodiments, magnets 654 may be positioned proximate to the alignment hole 652 to provide for holding the external fiber connector ferrule (not shown) into the alignment hole 652. The magnets 654 may provide a way for the plurality of optical fibers (not shown) to become unplugged if undue force is applied to the plurality of optical fibers, so that they are unplugged rather than broken by the undue force.

Figure 7:
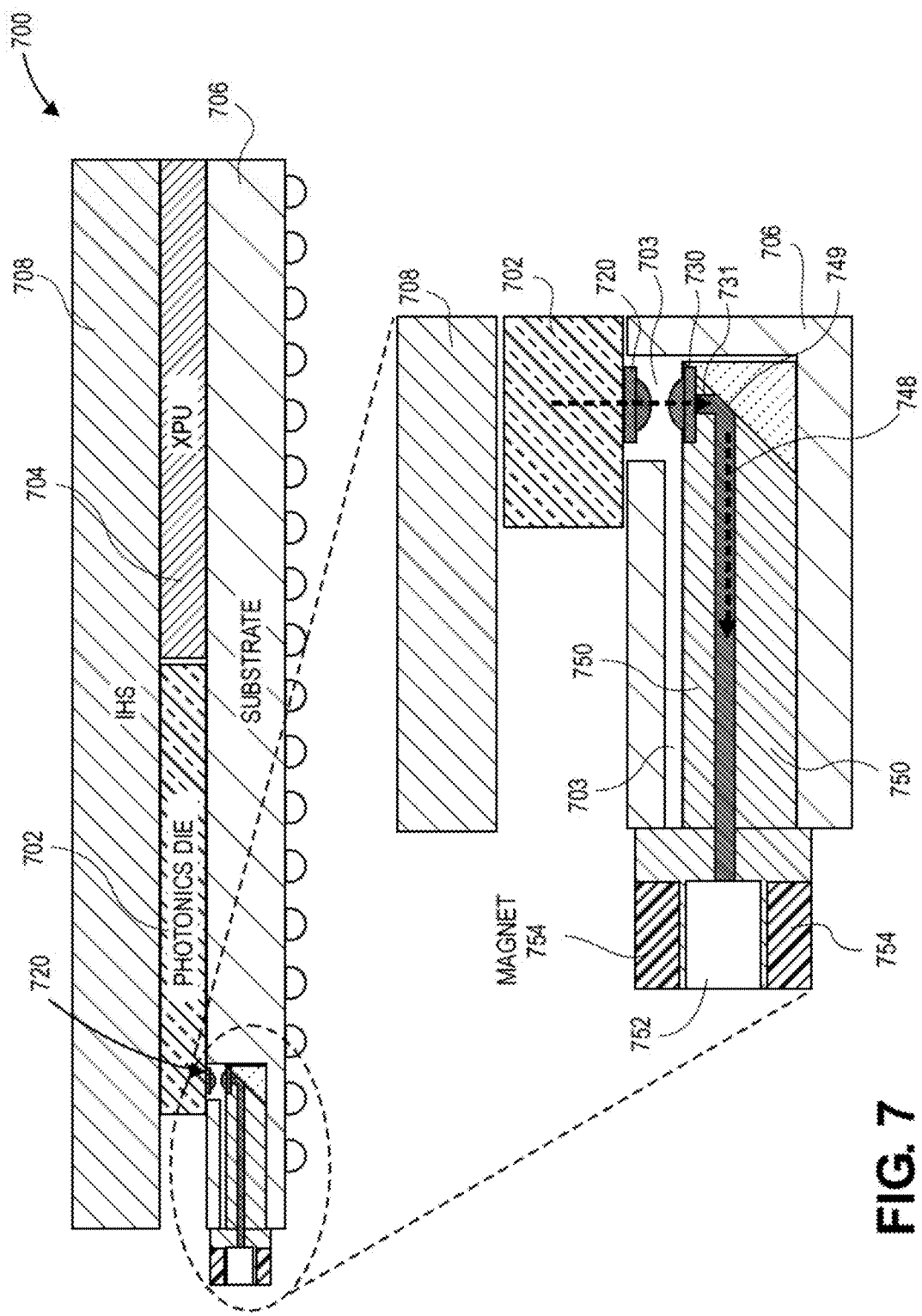
FIG. 7 illustrates an example package that includes a photonics die coupled with the substrate having an opening to allow a light path to reach a micro-lens array on the photonics die, where the light path includes a lens coupled with the substrate, in accordance with various embodiments.

FIG. 7 illustrates an example package that includes a photonics die coupled with the substrate having an opening to allow a light path to reach a micro-lens array on the photonics die, where the light path includes a lens coupled with the substrate, in accordance with various embodiments. Photonics package 700 shows a photonics die 702 that is electrically coupled with XPU 704, thermally coupled with IHS 708, and physically and/or electrically coupled with substrate 706, which may be similar to photonics die 502, XPU 504, IHS 508, and substrate 506 of FIG. 5. A micro-lens array 720, which may be similar to micro-lens array 520 of FIG. 5, is optically coupled with the photonics die 702. As shown, the portion of the photonics die 702 that includes the micro-lens array 720 may be disposed on the substrate 706 and above a cavity 703 in the substrate 706.

In embodiments, a connector body 750, which may be similar to connector body 650 of FIG. 6, may partially or completely fill the cavity 703 in the substrate 706. In embodiments, the connector body 750 may be a metal, an insulator, a dielectric, or some other material that may be used to support waveguide 748, which may be similar to waveguide 648 of FIG. 6. A second micro-lens array 730 may be physically coupled with and/or embedded into the connector body 750. In embodiments, the second micro-lens array 730 may be aligned with the micro-lens array 720 provide a high-quality optical connection between the two arrays. Second micro-lens array 730 may be optically coupled with a waveguide 731 that will conduct light to waveguide 748.

In embodiments, waveguide 748 may be a silicon waveguide, and optical fiber waveguide, or an open-air cavity through which light signals may be transmitted. In embodiments, one end of the waveguide 749 may angled so that the optical path 731 may be turned so that light signals may flow down through waveguide 748. In embodiments, the second micro-lens array 730 may be directly physically and optically coupled with the waveguide 748. In embodiments, the waveguide 748 may be a fiber array, an open-air channel, or some other medium able to conduct light. For the non-fiber cases, the channel surface of this waveguide needs to be smooth enough to avoid non-necessary light scattering, and the surrounding materials should also be properly selected in the right range of refractive index to avoid light leaking out.

In embodiments, the other end of the waveguide 748 may optically couple with an alignment hole 752, which may be similar to alignment hole 652 of FIG. 6. In this way, a plurality of optical fibers (not shown) may be inserted into the alignment hole 752 and provide a high-quality optical coupling with the waveguide 748. In embodiments, magnets 754, which may be similar to magnets 654 of FIG. 6, may be positioned proximate to the alignment hole 752 to provide for holding the plurality of optical fibers (not shown) into the alignment hole 752. The magnets 754 may provide a way for the plurality of optical fibers (not shown) to become unplugged if undue force is applied to the plurality of optical fibers, such that they are unplugged rather than broken by the undue force.

Figure 8:
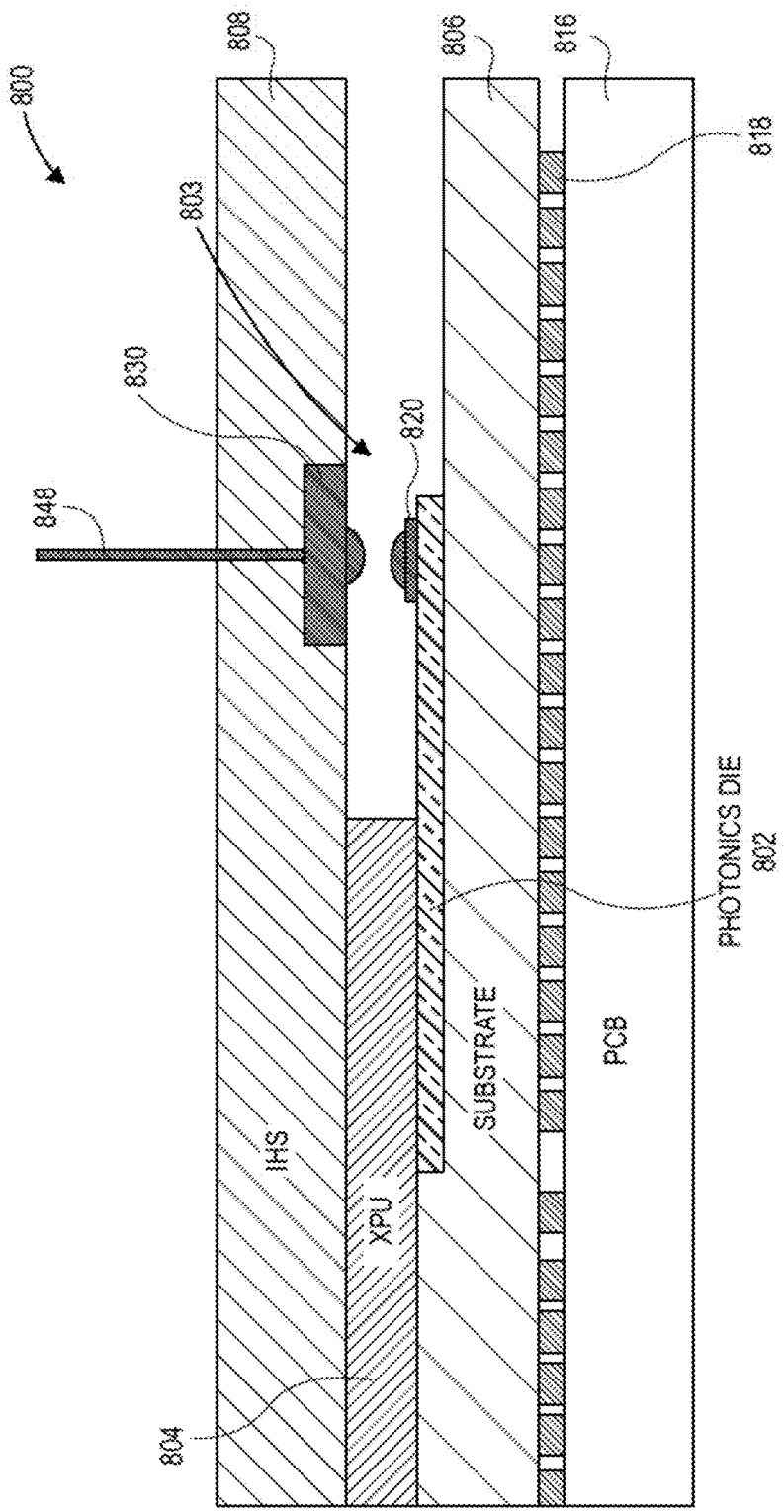
FIG. 8 illustrates an example package that includes a photonics die with a micro-lens array coupled to a side of the photonics die facing an integrated heat spreader (IHS) that has a micro-lens array directed toward the photonics die to optically coupled with the photonics die, in accordance with various embodiments.

FIG. 8 illustrates an example package that includes a photonics die with a micro-lens array coupled to a side of the photonics die facing an integrated heat spreader (IHS) that has a micro-lens array directed toward the photonics die to optically coupled with the photonics die, in accordance with various embodiments. Photonics package 800 shows a photonics die 802 that is electrically coupled with XPU 804, thermally coupled with IHS 808, and physically and/or electrically coupled with substrate 806, which may be similar to photonics die 502, XPU 504, IHS 508, and substrate 506 of FIG. 5. Photonics package 800 shows an example embodiment using an open cavity Photonic Integrated Chip (OCPIC) to directly electrically couple the photonics die 802 with the XPU 804.

A micro-lens array 820, which may be similar to micro-lens array 520 of FIG. 5, is optically coupled with the photonics die 802. As shown, the photonics die 802 that includes the micro-lens array 820 may be disposed on the substrate 806 and at least a portion of the photonics die 802 will be within a cavity 803 above the substrate 806. Note that the photonics die 802 may have bumps (not shown), similar to bumps 242 of FIG. 2, on both sides of the photonic die 802 in order to electrically couple with both the XPU 804 and the substrate 806.

In embodiments, a second micro-lens array 830 may be coupled with a portion of the IHS 808. In embodiments, the second micro-lens array 830 may be coupled proximate to or at an edge of the IHS 808 that is proximate to the cavity 803.

In embodiments, an optical path 848 may extend from the micro-lens array 830 through the integrated heat spreader 808. In embodiments, the optical path 848 may be a fiber-optic array, or some other waveguide. In embodiments, the substrate 806 may be electrically and/or physically coupled with a PCB 816 using a BGA 818.

In embodiments, the photonics die 802 may include a grating coupler (not shown) such as grating coupler 246 of FIG. 2. The grating coupler is to change the direction of the light path from, for example, perpendicular to the photonics die, to a waveguide that may be similar to waveguide 248 of FIG. 2, that is parallel to and included within the photonics die 802. This waveguide may be optically coupled with the micro-lens array 820.

Figure 9:
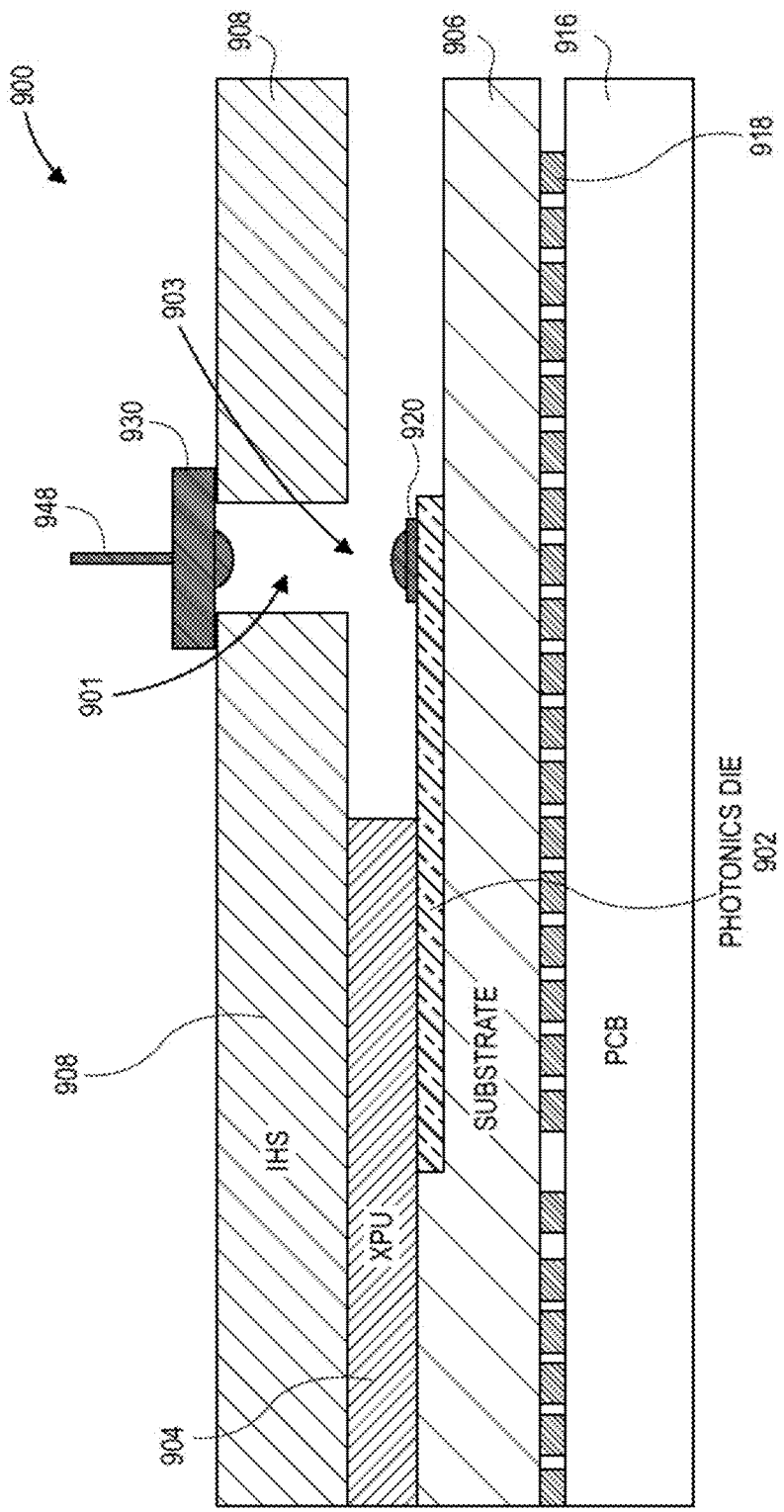
FIG. 9 illustrates an example package that includes a photonics die with a micro-lens array coupled to a side of the photonics die facing an IHS having an opening to provide a light path for the micro-lens array, in accordance with various embodiments.

FIG. 9 illustrates an example package that includes a photonics die with a micro-lens array coupled to a side of the photonics die facing an IHS having an opening to provide a light path for the micro-lens array, in accordance with various embodiments. Photonics package 900 shows a photonics die 902 that is electrically coupled with XPU 904, thermally coupled with IHS 908, and physically and/or electrically coupled with substrate 906, which may be similar to photonics die 502, XPU 504, IHS 508, and substrate 506 of FIG. 5. Photonics package 900 shows an example embodiment using an OCB to directly electrically couple the photonics die 902 with the XPU 904.

A micro-lens-array 920, which may be similar to micro-lens array 520 of FIG. 5, is optically coupled with the photonics die 902. As shown, the photonics die 902 that includes the micro-lens-array 920 may be disposed on the substrate 906 and at least a portion of the photonics die 902 will be within a cavity 903 above the substrate 906. Note that the photonics die 902 may have bumps (not shown), similar to bumps 242 of FIG. 2, on both sides of the photonic die 902 in order to electrically couple with both the XPU 904 and the substrate 906.

In embodiments, a second micro-lens array 930 may be coupled with a portion of the IHS 908. In embodiments, the second micro-lens array 930 may be coupled at or proximate to an outside edge of the IHS 908. In these embodiments, a cavity 901, that may be coupled with cavity 903, may be formed through the IHS 908 to allow light signals to pass from second micro-lens array 930 to micro-lens array 920. In embodiments, an optical path 948 may extend from the micro-lens array 930 to the outside of the optical package 900. In embodiments, the optical path 948 may be a fiber-optic array, or some other waveguide. In embodiments, the substrate 906 may be electrically and/or physically coupled with a PCB 916 using a BGA 918.

In embodiments, the photonics die 902 may include a grating coupler (not shown) such as grating coupler 246 of FIG. 2. The grating coupler is to change the direction of the light path from, for example, perpendicular to the photonics die 902, to a waveguide (not shown), but may be similar to waveguide 248 of FIG. 2, that is parallel to and included within the photonics die 902. This waveguide may be optically coupled with the micro-lens array 920.

Figure 10:
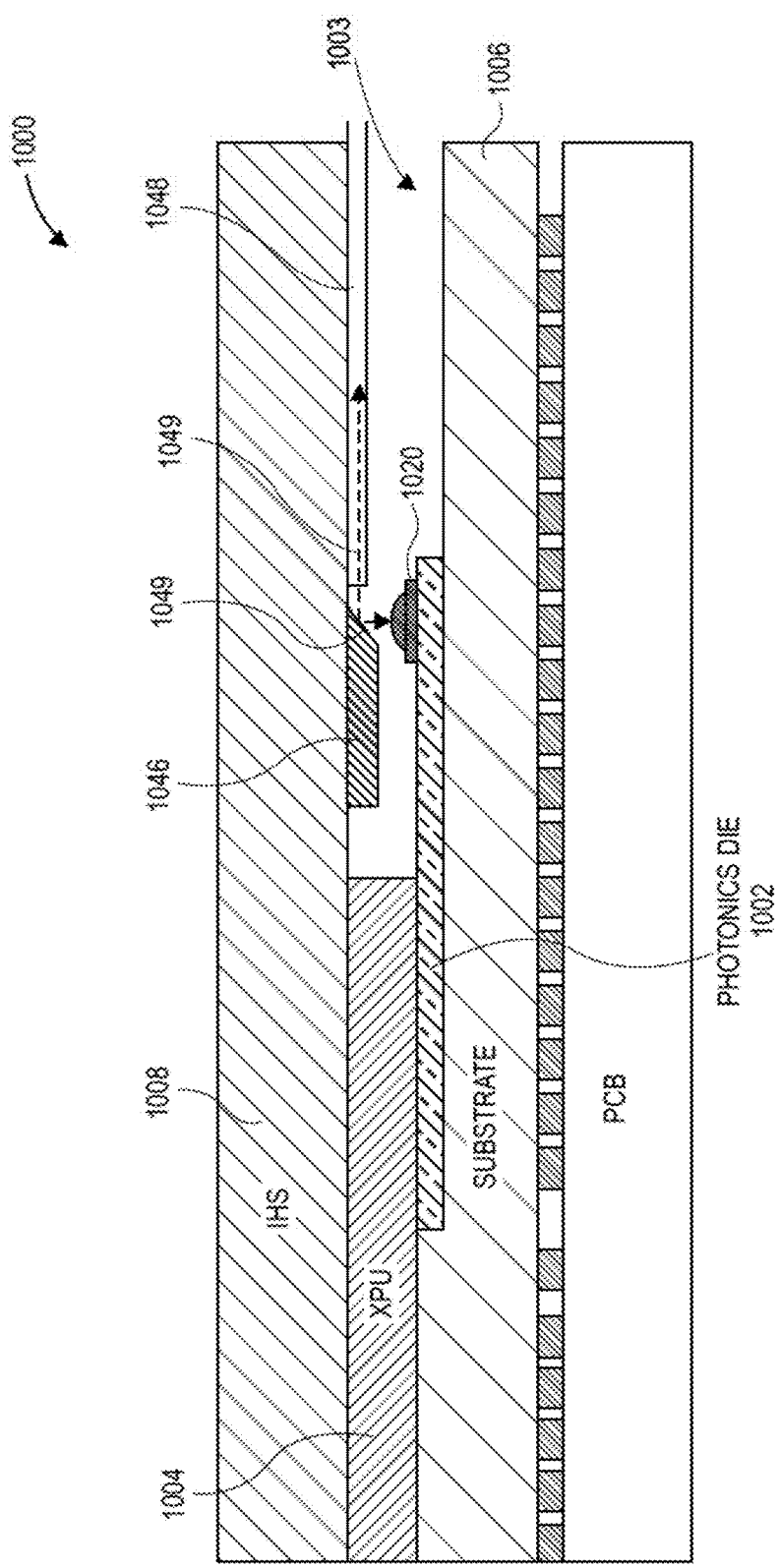
FIG. 10 illustrates an example package that includes a photonics die with a micro-lens array coupled to a side of the photonics die facing an IHS with a deflection prism coupled with the IHS to change direction of light along a path to the micro-lens array, in accordance with various embodiments.

FIG. 10 illustrates an example package that includes a photonics die with a micro-lens array coupled to a side of the photonics die facing an IHS with a deflection prism coupled with the IHS to change direction of light along a path to the micro-lens array, in accordance with various embodiments. Photonics package 1000 shows a photonics die 1002 that is electrically coupled with XPU 1004, thermally coupled with IHS 1008, and physically and/or electrically coupled with substrate 1006, which may be similar to photonics die 502, XPU 504, IHS 508, and substrate 506 of FIG. 5. Photonics package 1000 shows an example embodiment using an OCB to directly electrically couple the photonics die 1002 with the XPU 1004.

A micro-lens-array 1020, which may be similar to micro-lens array 520 of FIG. 5, is optically coupled with the photonics die 1002. As shown, the photonics die 1002 that includes the micro-lens-array 1020 may be disposed on the substrate 1006, and at least a portion of the photonics die 1002 will be within a cavity 1003 above the substrate 1006. Note that the photonics die 1002 may have bumps (not shown), similar to bumps 242 of FIG. 2, on both sides of the photonic die 1002 in order to electrically and/or physically couple with both the XPU 1004 and the substrate 1006.

In embodiments, a deflection mechanism 1046 may be physically coupled with the IHS 1008. In embodiments, the deflection mechanism 1046 may be at an angle to cause light in a light path from micro-lens array 1020 to change direction and to flow into an optical path 1048. In embodiments, optical path 1048 may be a waveguide or an optical fiber or an optical fiber array, with the fibers having a lensed facet 1049. In embodiments, the lensed facet 1049 may serve to increase the quality of the optical coupling between the micro-lens array 1020 and the optical path 1048. In embodiments, an end of the optical path 1048 may include one or more mechanisms as described above with respect to FIG. 6, including alignment holes 652 and magnets 654.

In embodiments, the photonics die 1002 may include a grating coupler (not shown) such as grating coupler 246 of FIG. 2. The grating coupler is to change the direction of the light path from, for example, perpendicular to the photonics die 1002, to a waveguide (not shown), but may be similar to waveguide 248 of FIG. 2, that is parallel to and included within the photonics die 1002. This waveguide is optically coupled with the micro-lens array 1020.

Figure 11:
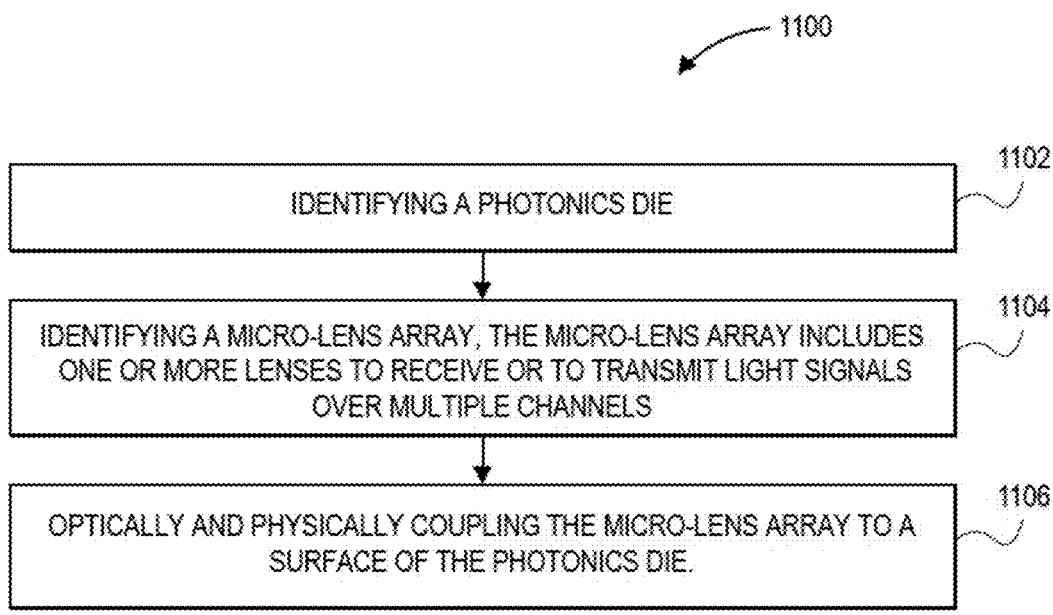
FIG. 11 illustrates an example process for manufacturing a photonics die with a micro-lens array, in accordance with various embodiments.
Figure 12:
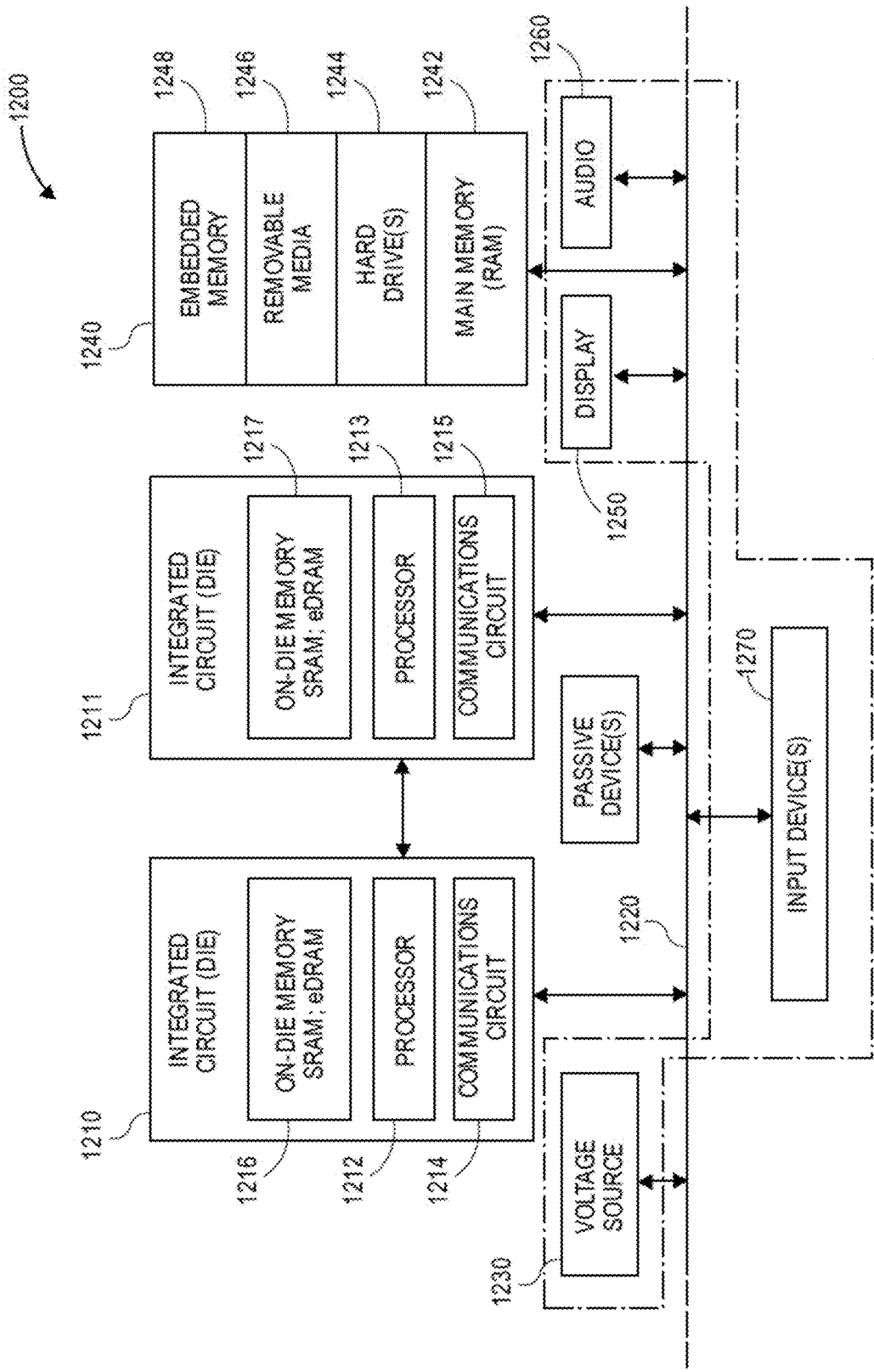
FIG. 12 schematically illustrates a computing device, in accordance with embodiments.

FIG. 11 illustrates an example process for manufacturing a photonics die with a micro-lens array, in accordance with various embodiments. Process 1100 may be performed using apparatus, systems, techniques, or processes as described herein, and particularly with respect to FIGS. 1-10. The process may start at block 1102.

At block 1102, the process may include identifying a photonics die. In embodiments, the photonics die may be similar to photonics die 202 of FIG. 2, 302 of FIG. 3, 402 of FIG. 4, 502 of FIG. 5, 602 of FIG. 6, 702 of FIG. 7, 802 of FIG. 8, 902 of FIG. 9, and/or 1002 of FIG. 10. In embodiments, the photonics die may include a photonics integrated circuit. In embodiments, the photonics die may be electrically and/or physically coupled with a substrate such as substrate 206 of FIG. 2. In embodiments, the photonics die may be electrically and/or physically coupled with an XPU such as XPU 204 of FIG. 2. In embodiments, the photonics die may be directly physically coupled with an XPU such as XPU 1004 of FIG. 10. In embodiments, the photonics die may include a grating coupler, such as grating coupler 246 of FIG. 2, that may be used to change the direction of an optical path within the photonics die.

At block 1104, the process may further include identifying a micro-lens array, the micro-lens array includes one or more lenses to receive or to transmit light signals over multiple channels. In embodiments, the micro-lens array may be similar to micro-lens array 220 of FIG. 2, 320, 321 of FIG. 3, 420 of FIG. 4, 520 of FIG. 5, 620 of FIG. 6, 720 of FIG. 7, 820 of FIG. 8, 920 of FIG. 9, and/or 1020 of FIG. 10. In embodiments, the micro-lens array may include multiple lenses, such as lens 222 of FIG. 2.

At block 1106, the process may further include optically and physically coupling the micro-lens array to a surface of the photonics die. In embodiments, this coupling may be accomplished using an optical epoxy, such as optical epoxy 224 of FIG. 2. In other embodiments, the alignment of the micro-lens array and the photonics die coupling may be facilitated by one or more physical features, such as V-groove 428 within photonics die 402 and bump 403 that may be part of the micro-lens array 420 of FIG. 4.

FIG. 11 schematically illustrates a computing device, in accordance with embodiments. The computer system 1100 (also referred to as the electronic system 1100) as depicted can embody all or part of one or more micro-lens array optically coupled with a photonics die, according to any of the several disclosed embodiments and their equivalents as set forth in this disclosure. The computer system 1100 may be a mobile device such as a netbook computer. The computer system 1100 may be a mobile device such as a wireless smart phone. The computer system 1100 may be a desktop computer. The computer system 1100 may be a hand-held reader. The computer system 1100 may be a server system. The computer system 1100 may be a supercomputer or high-performance computing system.

In an embodiment, the electronic system 1100 is a computer system that includes a system bus 1120 to electrically couple the various components of the electronic system 1100. The system bus 1120 is a single bus or any combination of busses according to various embodiments. The electronic system 1100 includes a voltage source 1130 that provides power to the integrated circuit 1110. In some embodiments, the voltage source 1130 supplies current to the integrated circuit 1110 through the system bus 1120.

The integrated circuit 1110 is electrically coupled to the system bus 1120 and includes any circuit, or combination of circuits according to an embodiment. In an embodiment, the integrated circuit 1110 includes a processor 1112 that can be of any type. As used herein, the processor 1112 may mean any type of circuit such as, but not limited to, a microprocessor, a microcontroller, a graphics processor, a digital signal processor, or another processor. In an embodiment, the processor 1112 includes, or is coupled with, all or part of one or more micro-lens array optically coupled with a photonics die, as disclosed herein. In an embodiment, SRAM embodiments are found in memory caches of the processor. Other types of circuits that can be included in the integrated circuit 1110 are a custom circuit or an application-specific integrated circuit (ASIC), such as a communications circuit 1114 for use in wireless devices such as cellular telephones, smart phones, pagers, portable computers, two-way radios, and similar electronic systems, or a communications circuit for servers. In an embodiment, the integrated circuit 1110 includes on-die memory 1116 such as static random-access memory (SRAM). In an embodiment, the integrated circuit 1110 includes embedded on-die memory 1116 such as embedded dynamic random-access memory (eDRAM).

In an embodiment, the integrated circuit 1110 is complemented with a subsequent integrated circuit 1111. Useful embodiments include a dual processor 1113 and a dual communications circuit 1115 and dual on-die memory 1117 such as SRAM. In an embodiment, the dual integrated circuit 1110 includes embedded on-die memory 1117 such as eDRAM.

In an embodiment, the electronic system 1100 also includes an external memory 1140 that in turn may include one or more memory elements suitable to the particular application, such as a main memory 1142 in the form of RAM, one or more hard drives 1144, and/or one or more drives that handle removable media 1146, such as diskettes, compact disks (CDs), digital variable disks (DVDs), flash memory drives, and other removable media known in the art. The external memory 1140 may also be embedded memory 1148 such as the first die in a die stack, according to an embodiment.

In an embodiment, the electronic system 1100 also includes a display device 1150, an audio output 1160. In an embodiment, the electronic system 1100 includes an input device such as a controller 1170 that may be a keyboard, mouse, trackball, game controller, microphone, voice-recognition device, or any other input device that inputs information into the electronic system 1100. In an embodiment, an input device 1170 is a camera. In an embodiment, an input device 1170 is a digital sound recorder. In an embodiment, an input device 1170 is a camera and a digital sound recorder.

As shown herein, the integrated circuit 1110 can be implemented in a number of different embodiments, including one or more micro-lens array optically coupled with a photonics die, according to any of the several disclosed embodiments and their equivalents, an electronic system, a computer system, one or more methods of fabricating an integrated circuit, and one or more methods of fabricating an electronic assembly that includes a package substrate implementing all or part of one or more micro-lens array optically coupled with a photonics die, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed processes used for one or more micro-lens array optically coupled with a photonics die and their equivalents. A foundation substrate may be included, as represented by the dashed line of FIG. 11. Passive devices may also be included, as is also depicted in FIG. 11.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

The following paragraphs describe examples of various embodiments.

EXAMPLES

Example 1 is an apparatus comprising: a photonics die; and a micro-lens array physically and optically coupled with a surface of the photonics die, the micro-lens array includes one or more lenses to receive or to transmit light signals over multiple optical channels.

Example 2 may include the apparatus of example 1, wherein the one or more lenses of the micro-lens array are in a line.

Example 3 may include the apparatus of example 2, wherein the micro-lens array further includes a plurality of micro-lens arrays.

Example 4 may include the apparatus of example 3, wherein the plurality of micro-lens arrays are in a line, and wherein the one or more lenses of each of the micro-lens arrays are in a line.

Example 5 may include the apparatus of example 3, wherein the plurality of micro-lens arrays are parallel, and wherein the one or more lenses of each of the micro-lens arrays the form parallel lines.

Example 6 may include the apparatus of example 1, wherein the surface of the photonics die is a top or a bottom surface of the photonics die.

Example 7 may include the apparatus of example 1, further comprising one or more physical features on the photonics die to align the micro-lens array with the surface of the photonics die prior to physical and optical coupling of the micro-lens array to the surface of the photonics die.

Example 8 may include the apparatus of example 7, wherein the surface of the photonics die includes one or more V-grooves to receive the one or more physical features on the photonics die.

Example 9 may include the apparatus of example 8, wherein a first surface of the micro-lens array that includes multiple lenses is opposite a second surface of the micro-lens array; and further comprising one or more features of the second surface of the micro-lens array, wherein the one or more features of the second surface are to fit, respectively, into the one or more V-grooves of the surface of the photonics die.

Example 10 may include the apparatus of example 1, wherein the micro-lens array is physically and optically coupled with the surface of the photonics die using an epoxy.

Example 11 may include the apparatus of example 10, wherein the surface of the photonics die further includes an epoxy barrier to keep the epoxy used to physically couple the micro-lens array with the surface of the photonics die from entering a region on the surface of the photonics die.

Example 12 may include the apparatus of example 11, wherein the region on the surface of the photonics die includes a bump region.

Example 13 may include the apparatus of example 1, wherein the photonics die is a silicon photonics die.

Example 14 may include the apparatus of example 1, wherein the one or more lenses of the micro-lens array are in a line.

Example 15 may include the apparatus of any one of examples 1-14, further comprising one or more grating couplers embedded into the surface of the photonics die, each grating coupler positioned, respectively, proximate to each lens to facilitate the transmission or reception of light between each lens of the lens-array and the photonics die.

Example 16 may be a method, comprising: identifying a photonics die; identifying a micro-lens array, the micro-lens array includes one or more lenses to receive or to transmit light signals over multiple channels; and optically and physically coupling the micro-lens array to a surface of the photonics die.

Example 17 may include the method of example 16, wherein optically and physically coupling the micro-lens array to a surface of the photonics die further includes applying an epoxy to optically and physically couple the micro-lens array to the surface of the photonics die.

Example 18 may include the method of any one of examples 16-17, wherein optically and physically coupling the micro-lens array to a surface of the photonics die further includes aligning one or more physical features of the micro-lens array with one or more physical features of the surface of the photonics die.

Example 19 is a package, comprising: a photonics device, comprising: a photonics die; and a micro-lens array physically and optically coupled with a surface of the photonics die, the micro-lens array includes one or more lenses to receive or to transmit light signals over multiple channels; and a component of a photonics package physically coupled with the photonics device, the physical coupling providing a light path to optically couple with the one or more lenses of the micro-lens array.

Example 20 may include the package of example 19, wherein the component is electrically coupled with the photonics device.

Example 21 may include the package of example 19, wherein the photonics die is a silicon photonics die.

Example 22 may include the package of example 19, wherein the component further includes an opening proximate to the one or more lenses of the micro-lens array, the opening to provide the light path.

Example 23 may include the package of example 19, wherein the component includes one or more lenses that are proximate to and optically coupled with the one or more lenses of the micro-lens array.

Example 24 may include the package of example 19, wherein the component of the photonics package is a selected one of: a substrate, an integrated heat spreader (IHS), a system on chip (SOC), a CPU, a graphics processor unit (GPU), a field programmable gate array (FPGA), application-specific integrated circuit (ASIC), or an accelerator.

Example 25 may include the package of any one of examples 19-24, wherein the light path includes a reflector to change a direction of light traveling in the light path.

What is claimed is:

1. An apparatus comprising:
   a photonics die, the photonics die having a plurality of conductive bumps and a barrier on a surface, the barrier comprising an epoxy material;
   a micro-lens array physically and optically coupled with the surface of the photonics die, the micro-lens array comprising a plurality of lenses to receive or to transmit light signals over multiple optical channels, wherein the barrier is between the plurality of conductive bumps and the micro-lens array; and
   a plurality of grating couplers embedded in the surface of the photonics die, each one of the plurality of lenses vertically overlapping with a corresponding one of the plurality of grating couplers to facilitate the transmission or reception of light between each one of the plurality of lenses of the micro-lens array and the photonics die, and each one of the plurality of lenses having a convex surface facing away from the corresponding one of the plurality of grating couplers.

2. The apparatus of claim 1, wherein the plurality of lenses of the micro-lens array are in a line.

3. The apparatus of claim 2, wherein the micro-lens array further includes a plurality of micro-lens arrays.

4. The apparatus of claim 3, wherein the plurality of micro-lens arrays are in a line, and wherein the plurality of lenses of each of the micro-lens arrays are in a line.

5. The apparatus of claim 3, wherein the plurality of micro-lens arrays are parallel, and wherein the plurality of lenses of each of the micro-lens arrays the form parallel lines.

6. The apparatus of claim 1, wherein the surface of the photonics die is a top or a bottom surface of the photonics die.

7. The apparatus of claim 1, further comprising one or more physical features on the photonics die to align the micro-lens array with the surface of the photonics die prior to physical and optical coupling of the micro-lens array to the surface of the photonics die.

8. The apparatus of claim 7, wherein the surface of the photonics die includes one or more V-grooves to receive the one or more physical features on the photonics die.

9. The apparatus of claim 8, wherein a first surface of the micro-lens array that includes multiple lenses is opposite a second surface of the micro-lens array; and further comprising one or more features of the second surface of the micro-lens array, wherein the one or more features of the second surface are to fit, respectively, into the one or more V-grooves of the surface of the photonics die.

10. The apparatus of claim 1, wherein the micro-lens array is physically and optically coupled with the surface of the photonics die using an epoxy.

11. The apparatus of claim 1, wherein the photonics die is a silicon photonics die.

12. A method, comprising:
identifying a photonics die, the photonics die having a plurality of conductive bumps and a barrier on a surface, the barrier comprising an epoxy material;
identifying a micro-lens array, the micro-lens array comprising a plurality of lenses to receive or to transmit light signals over multiple channels; and
optically and physically coupling the micro-lens array to a surface of the photonics die, wherein the barrier is between the plurality of conductive bumps and the micro-lens array, wherein a plurality of grating couplers is embedded in the surface of the photonics die, each one of the plurality of lenses vertically overlapping with a corresponding one of the plurality of grating couplers to facilitate the transmission or reception of light between each one of the plurality of lenses of the micro-lens array and the photonics die, and each one of the plurality of lenses having a convex surface facing away from the corresponding one of the plurality of grating couplers.

13. The method of claim 12, wherein optically and physically coupling the micro-lens array to a surface of the photonics die further includes applying an epoxy to optically and physically couple the micro-lens array to the surface of the photonics die.

14. The method of claim 12, wherein optically and physically coupling the micro-lens array to a surface of the photonics die further includes aligning one or more physical features of the micro-lens array with one or more physical features of the surface of the photonics die.

15. A package, comprising:
a photonics device, comprising:
a photonics die, the photonics die having a plurality of conductive bumps and a barrier on a surface, the barrier comprising an epoxy material;
a micro-lens array physically and optically coupled with the surface of the photonics die, the micro-lens array comprising a plurality of lenses to receive or to transmit light signals over multiple channels, wherein the barrier is between the plurality of conductive bumps and the micro-lens array;
a plurality of grating couplers embedded in the surface of the photonics die, each one of the plurality of lenses vertically overlapping with a corresponding one of the plurality of grating couplers to facilitate the transmission or reception of light between each one of the plurality of lenses of the micro-lens array and the photonics die, and each one of the plurality of lenses having a convex surface facing away from the corresponding one of the plurality of grating couplers; and
a component of a photonics package physically coupled with the photonics device, the physical coupling providing a light path to optically couple with the one or more lenses of the micro-lens array.

16. The package of claim 15, wherein the component is electrically coupled with the photonics device.

17. The package of claim 15, wherein the photonics die is a silicon photonics die.

18. The package of claim 15, wherein the component further includes an opening proximate to the one or more lenses of the micro-lens array, the opening to provide the light path.

19. The package of claim 15, wherein the component includes one or more lenses that are proximate to and optically coupled with the one or more lenses of the micro-lens array.

20. The package of claim 15, wherein the component of the photonics package is a selected one of: a substrate, an integrated heat spreader (IHS), a system on chip (SOC), a CPU, a graphics processor unit (GPU), a field programmable gate array (FPGA), application-specific integrated circuit (ASIC), or an accelerator.

21. The package of claim 15, wherein the light path includes a reflector to change a direction of light traveling in the light path.

* * * * *